United States Patent
Lull et al.

(10) Patent No.: US 11,961,394 B2
(45) Date of Patent: Apr. 16, 2024

(54) METHODS AND SYSTEMS FOR GUIDING ROAD USERS

(71) Applicant: DENSO International America, Inc., Southfield, MI (US)

(72) Inventors: Joseph Lull, South Haven, MI (US); Wei Zhang, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 274 days.

(21) Appl. No.: 17/216,248

(22) Filed: Mar. 29, 2021

(65) Prior Publication Data

US 2021/0312796 A1     Oct. 7, 2021

Related U.S. Application Data

(60) Provisional application No. 63/003,332, filed on Apr. 1, 2020.

(51) Int. Cl.
*G08G 1/01*     (2006.01)
*B60W 30/08*   (2012.01)
*G06V 20/56*    (2022.01)

(52) U.S. Cl.
CPC .......... *G08G 1/0116* (2013.01); *B60W 30/08* (2013.01); *G06V 20/56* (2022.01); *G08G 1/0133* (2013.01); *G08G 1/0145* (2013.01)

(58) Field of Classification Search
CPC .. G08G 1/0116; G08G 1/0133; G08G 1/0145; B60W 30/08
See application file for complete search history.

(56) References Cited

U.S. PATENT DOCUMENTS

| | | | | |
|---|---|---|---|---|
| 8,452,529 B2* | 5/2013 | Alten | ................. | G01C 21/3484 |
| | | | | 701/410 |
| 10,096,038 B2* | 10/2018 | Ramirez | ............ | G01C 21/3461 |
| 10,956,855 B1* | 3/2021 | Coughran | .............. | G06N 20/10 |
| 11,062,341 B2* | 7/2021 | Ramirez | ............ | G06Q 10/0635 |
| 11,170,652 B2* | 11/2021 | Gardner | ............ | G01C 21/3453 |
| 11,175,153 B2* | 11/2021 | Pham | ..................... | G08G 1/005 |
| 2006/0247852 A1 | 11/2006 | Kortge et al. | | |
| 2009/0182492 A1* | 7/2009 | Alten | ................. | G01C 21/3484 |
| | | | | 701/532 |
| 2013/0080055 A1 | 3/2013 | Speier et al. | | |
| 2016/0171521 A1* | 6/2016 | Ramirez | ................ | B60K 35/00 |
| | | | | 701/409 |
| 2018/0174449 A1* | 6/2018 | Nguyen | ................. | G08G 1/015 |
| 2018/0374113 A1* | 12/2018 | Ramirez | .......... | G08G 1/096838 |

(Continued)

*Primary Examiner* — Luis A Martinez Borrero
(74) *Attorney, Agent, or Firm* — Harness, Dickey & Pierce, P.L.C.

(57) ABSTRACT

A method for guiding a user operating a requesting device includes identifying requesting parameters of the requesting device, where the requesting parameters include a location of a requesting device, a trajectory of a requesting device, or a combination thereof. The method includes generating one or more safety scores associated with one or more roadways based on vehicle behavior information associated with one or more vehicles, pedestrian behavior information associated with one or more roadside unit devices, or a combination thereof. The method includes determining a route of the requesting device based on the one or more safety scores and the requesting parameters and broadcasting the route to the requesting device.

24 Claims, 8 Drawing Sheets

(56) References Cited

U.S. PATENT DOCUMENTS

| | | | |
|---|---|---|---|
| 2020/0365015 A1* | 11/2020 | Nguyen | G08G 1/0129 |
| 2020/0378771 A1* | 12/2020 | Beaurepaire | G01C 21/3461 |
| 2020/0394922 A1* | 12/2020 | Gardner | G08G 1/096811 |
| 2021/0055122 A1* | 2/2021 | Pham | G08G 1/0145 |
| 2021/0197720 A1* | 7/2021 | Houston | G06N 3/045 |
| 2021/0197813 A1* | 7/2021 | Houston | G05D 1/0223 |
| 2021/0253128 A1* | 8/2021 | Nister | G06N 7/01 |

* cited by examiner

METHODS AND SYSTEMS FOR GUIDING ROAD USERS

CROSS-REFERENCE TO RELATED APPLICATIONS

This application claims the benefit of and priority to U.S. Provisional Application No. 63/003,332 filed on Apr. 1, 2020. The disclosure of the above application is incorporated herein by reference.

FIELD

The present disclosure relates to systems and methods for guiding road users.

BACKGROUND

The statements in this section merely provide background information related to the present disclosure and may not constitute prior art.

A roadway system may include various types of roadway users (e.g., vehicles, pedestrians, bicyclists, among others) traveling to and from various locations. The roadway users may use navigation systems of a vehicle or other portable device that provide travel routes to the roadway users. However, the travel routes may instruct the roadway users to travel through areas associated with high vehicle traffic, improper pedestrian street crossings (e.g., jaywalking), and/or other undesirable conditions.

SUMMARY

This section provides a general summary of the disclosure and is not a comprehensive disclosure of its full scope or all of its features.

The present disclosure provides a method for guiding a user operating a requesting device that includes identifying requesting parameters of the requesting device, where the requesting parameters include a location of a requesting device, a trajectory of a requesting device, or a combination thereof. The method includes generating one or more safety scores associated with one or more roadways based on vehicle behavior information associated with one or more vehicles, pedestrian behavior information associated with one or more roadside unit devices, or a combination thereof. The method includes determining a route of the requesting device based on the one or more safety scores and the requesting parameters and broadcasting the route to the requesting device.

In some forms, the route is determined based on a comparison of the one or more safety scores to a threshold score.

In some forms, the route is associated with a set of roadways from among the one or more roadways, and each roadway from the set of roadways has a respective safety score that is greater than the threshold score.

In some forms, the route is determined based on traffic signal state information associated with the one or more roadways.

In some forms, the requesting device is one of a subject vehicle from among the one or more vehicles and a subject roadside unit device from among the one or more roadside unit devices.

In some forms, the requesting device is the subject vehicle, the route is determined based on energy information associated the subject vehicle, and the energy information is indicative of an electrical charge of the subject vehicle, a fuel level of the subject vehicle, or a combination thereof.

In some forms, the vehicle behavior information is indicative of a speed of the one or more vehicles, an aggressiveness of the one or more vehicles, a trajectory of the one or more vehicles, or a combination thereof.

In some forms, the method further includes determining the vehicle behavior information based on one or more basic safety messages broadcasted by a vehicle communication system.

In some forms, the pedestrian behavior information is indicative of a location of the one or more roadside unit devices, a trajectory of the one or more roadside unit devices, a speed of the one or more roadside unit devices, or a combination thereof.

In some forms, the method further includes determining the pedestrian behavior information based on one or more personal safety messages broadcasted by a pedestrian-to-infrastructure communication system.

The present disclosure provides a method for guiding a user operating a requesting device that includes identifying requesting parameters of the requesting device, where the requesting parameters include a location of a requesting device, a trajectory of a requesting device, or a combination thereof. The method includes generating one or more safety scores associated with one or more roadways based on vehicle behavior information associated with one or more vehicles, pedestrian behavior information associated with one or more roadside unit devices, or a combination thereof. The vehicle behavior information is indicative of a speed of the one or more vehicles, an aggressiveness of the one or more vehicles, a trajectory of the one or more vehicles, or a combination thereof. The pedestrian behavior information is indicative of a location of the one or more roadside unit devices, a trajectory of the one or more roadside unit devices, a speed of the one or more roadside unit devices, or a combination thereof. The method includes determining a route of the requesting device based on the one or more safety scores and the requesting parameters and broadcasting the route to the requesting device.

In some forms, the route is determined based on a comparison of the one or more safety scores to a threshold score.

In some forms, route is associated with a set of roadways from among the one or more roadways, and each roadway from the set of roadways has a respective safety score that is greater than the threshold score.

In some forms, the route is determined based on traffic signal state information associated with the one or more roadways.

In some forms, the requesting device is one of a subject vehicle from among the one or more vehicles and a subject roadside unit device from among the one or more roadside unit devices.

In some forms, the requesting device is the subject vehicle, the route is determined based on energy information associated the subject vehicle, and the energy information is indicative of an electrical charge of the subject vehicle, a fuel level of the subject vehicle, or a combination thereof.

In some forms, the method further includes determining the vehicle behavior information based on one or more basic safety messages broadcasted by a vehicle communication system and determining the pedestrian behavior information based on one or more personal safety messages broadcasted by a pedestrian-to-infrastructure communication system.

The present disclosure provides a system including a processor and a nontransitory computer-readable medium including instructions that are executable by the processor. The instructions include identifying requesting parameters of the requesting device, where the requesting parameters include a location of a requesting device, a trajectory of a requesting device, or a combination thereof. The instructions include generating one or more safety scores associated with one or more roadways based on vehicle behavior information associated with one or more vehicles, pedestrian behavior information associated with one or more roadside unit devices, or a combination thereof. The vehicle behavior information is indicative of a speed of the one or more vehicles, an aggressiveness of the one or more vehicles, a trajectory of the one or more vehicles, or a combination thereof. The pedestrian behavior information is indicative of a location of the one or more roadside unit devices, a trajectory of the one or more roadside unit devices, a speed of the one or more roadside unit devices, or a combination thereof. The instructions include determining a route of the requesting device based on the one or more safety scores and the requesting parameters and broadcasting the route to the requesting device.

In some forms, the route is determined based on a comparison of the one or more safety scores to a threshold score.

In some forms, route is associated with a set of roadways from among the one or more roadways, and each roadway from the set of roadways has a respective safety score that is greater than the threshold score.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to systems and methods for guiding an operator of a requesting device (e.g., an operator of a vehicle, a pedestrian/bicyclist operating a smartphone or wearable device, among others). More specifically, a path planning system is configured to identify requesting parameters provided by the operator of the requesting device, which include a location of a requesting device and/or a trajectory of a requesting device. The path planning system generates safety scores associated with roadways of the roadway system based on vehicle behavior information and/or pedestrian behavior information. The path planning system determines a route of the requesting device based on the safety scores and the parameters and broadcasts the route to the requesting device. As such, the path planning system is configured to provide a route to the requesting device that inhibits travel through areas associated with undesirable conditions, such as aggressive vehicle behavior and/or improper pedestrian street crossings.

Figure 1:
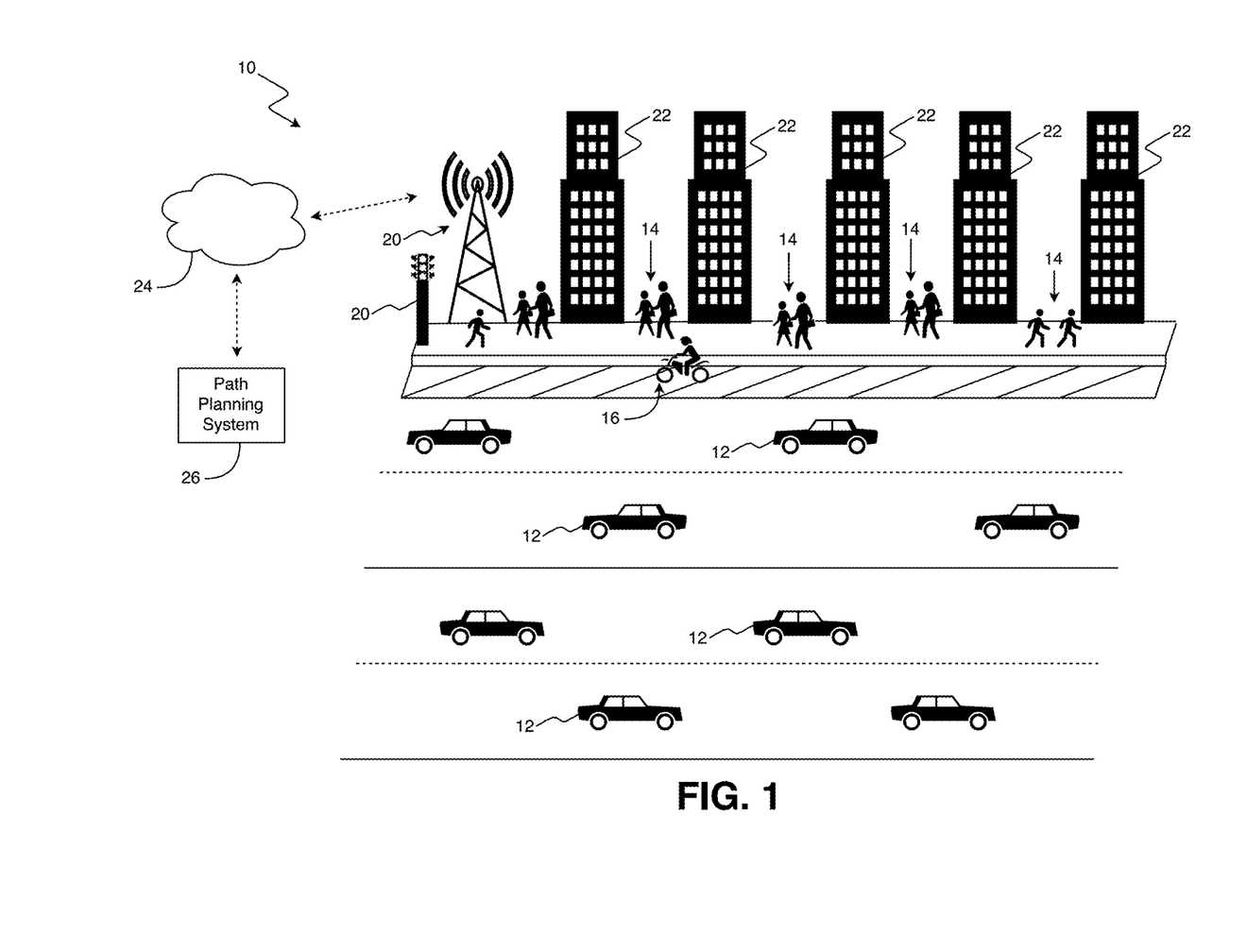
FIG. 1 illustrates a roadway system in accordance with the teachings of the present disclosure.

Referring to FIG. 1, a roadway system 10 is provided. The roadway system 10 generally includes vehicles 12, pedestrians 14, bicyclists 16, an infrastructure 20 (e.g., a wireless communication tower, a traffic signal, etc.), buildings 22, a network 24, and a path planning system 26.

In one form, the vehicles 12, are equipped with at least one of a vehicle-to-vehicle, vehicle-to-infrastructure, vehicle-to-network, vehicle-to-pedestrian, vehicle-to-device, and vehicle-to-grid communication system (collectively referred to as "V2X systems"). The pedestrians 14 may be equipped with at least one of a pedestrian-to-vehicle, pedestrian-to-infrastructure, pedestrian-to-network, pedestrian-to-pedestrian, pedestrian-to-device, and pedestrian-to-grid communication system. The bicyclists 16 may be equipped with at least one of a bicyclist-to-vehicle, bicyclist-to-infrastructure, bicyclist-to-network, bicyclist-to-pedestrian, bicyclist-to-device, and bicyclist-to-grid communication system. The communication systems associated with the pedestrians 14 and the bicyclists 16 may be collectively referred to herein as "P2X systems." The infrastructures 20 may be equipped with at least one of an infrastructure-to-vehicle, infrastructure-to-infrastructure, infrastructure-to-network, infrastructure-to-pedestrian, infrastructure-to-device, and infrastructure-to-grid, and infrastructure-to-bicyclist communication system (collectively referred to as "I2X systems").

The V2X systems, the P2X systems, and the I2X systems are collectively referred to herein as "RU2X systems" and are described below in further detail with reference to FIG. 4. In one form, the RU2X systems are dedicated short-range communication (DSRC) system and/or cellular RU2X (e.g., C-V2X, C-P2X, C-I2X) systems that communicate using a 75 megahertz (MHz) band around a 5.9 gigahertz (GHz) signal. It should be understood that other communication systems, center frequencies, and/or bandwidths may be implemented within the RU2X systems in other forms.

In one form, the RU2X systems may be configured to transmit and receive signals representing, for example, early warnings of accidents and driving hazards to and from other RU2X systems provided at the vehicles 12, the pedestrians 14, the bicyclist 16, and the infrastructure 20. Accordingly, local safety systems communicatively coupled to the RU2X system may be configured to predict future accidents and driving hazards based on communication with devices equipped with the RU2X systems by calculating the current and future positions of the vehicles 12.

The RU2X systems may also improve a fuel efficiency of the vehicles 12 by transmitting and receiving information corresponding to state of a traffic signal as the infrastructure 20. For example, the RU2X systems may be configured to communicate a timing of the traffic signal to an operator of the vehicle 12, thereby allowing the operator to optimize fuel efficiency and perform timesaving driving habits. For instance, the RU2X system may be configured to communicate with the traffic signal and alert the operator as to how much time the operator has until the light will change from a red light to a green light, a green light to a yellow light, or a yellow light to a red light. As another example, the RU2X system may instruct the operator to operate the vehicle 12 at a certain speed in order to avoid being stopped by a red light on a traffic route.

In one form, the path planning system 26 is communicably coupled to the RU2X systems of the vehicles 12, the pedestrians 14, the bicyclists 16, and the infrastructure 20 via a suitable wireless communication protocol implemented by the network 24, such as a cellular protocol (e.g. e.g., 3GPP, 4G LTE, 5G, among others) a wireless fidelity (Wi-Fi)-type protocol, a satellite communication protocol, among others. The path planning system 26 is configured is configured to identify requesting parameters provided by, for example, an operator of the vehicle 12. The requesting parameters may include a location of the vehicle 12 and/or a trajectory of the vehicle 12. The path planning system 26 generates safety scores associated with one or more roadways of the roadway system 10 based on vehicle behavior information of other vehicles 12, the pedestrians 14, and/or the bicyclists 16, as described below in further detail. In one form, the path planning system 26 determines a route of the vehicle 12 based on the safety scores and the parameters and broadcasts the route to the vehicle 12.

Figure 2:
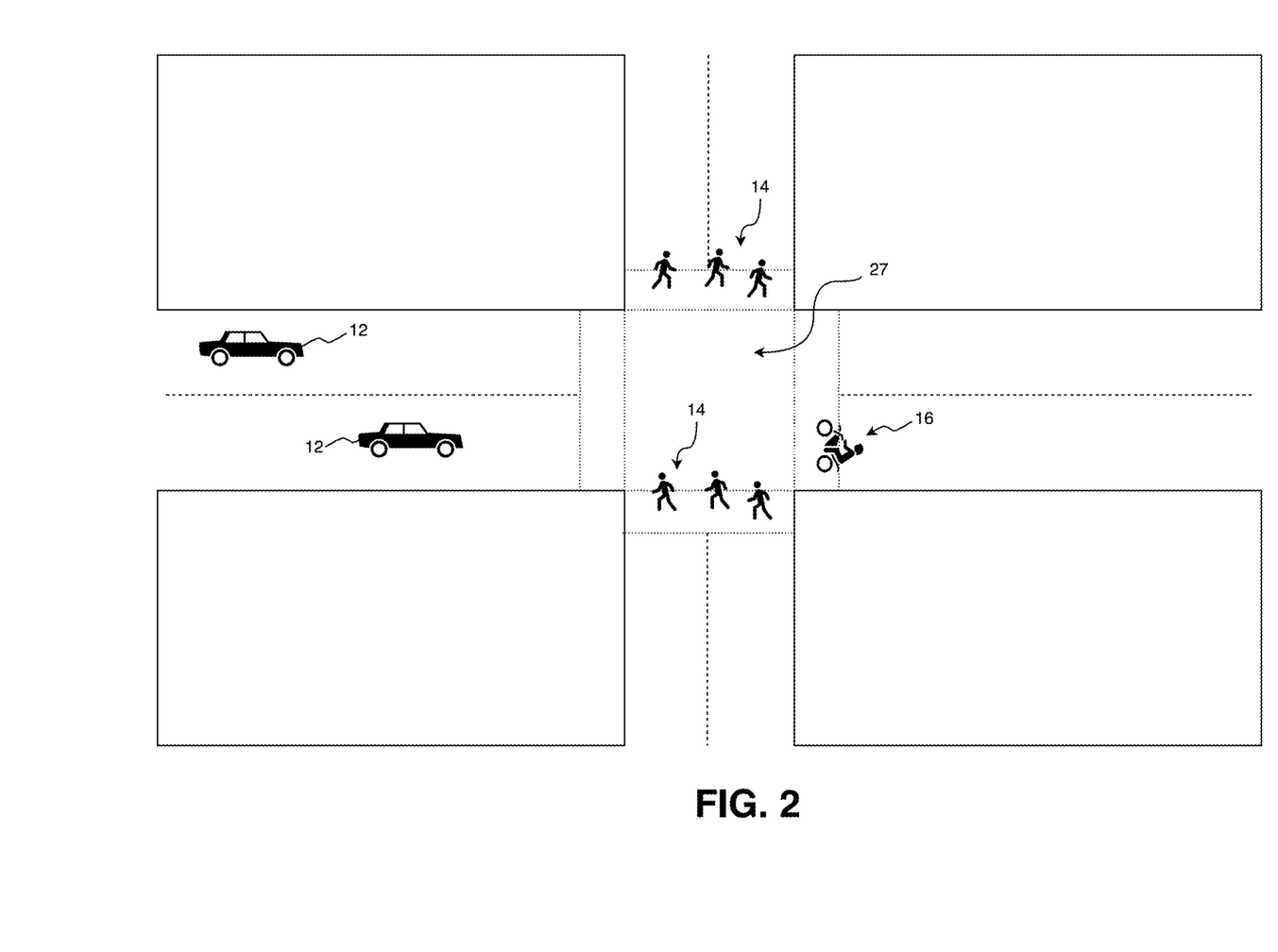
FIG. 2 illustrates a roadway system with one or more vehicles and pedestrians in accordance with the teachings of the present disclosure.
Figure 3:
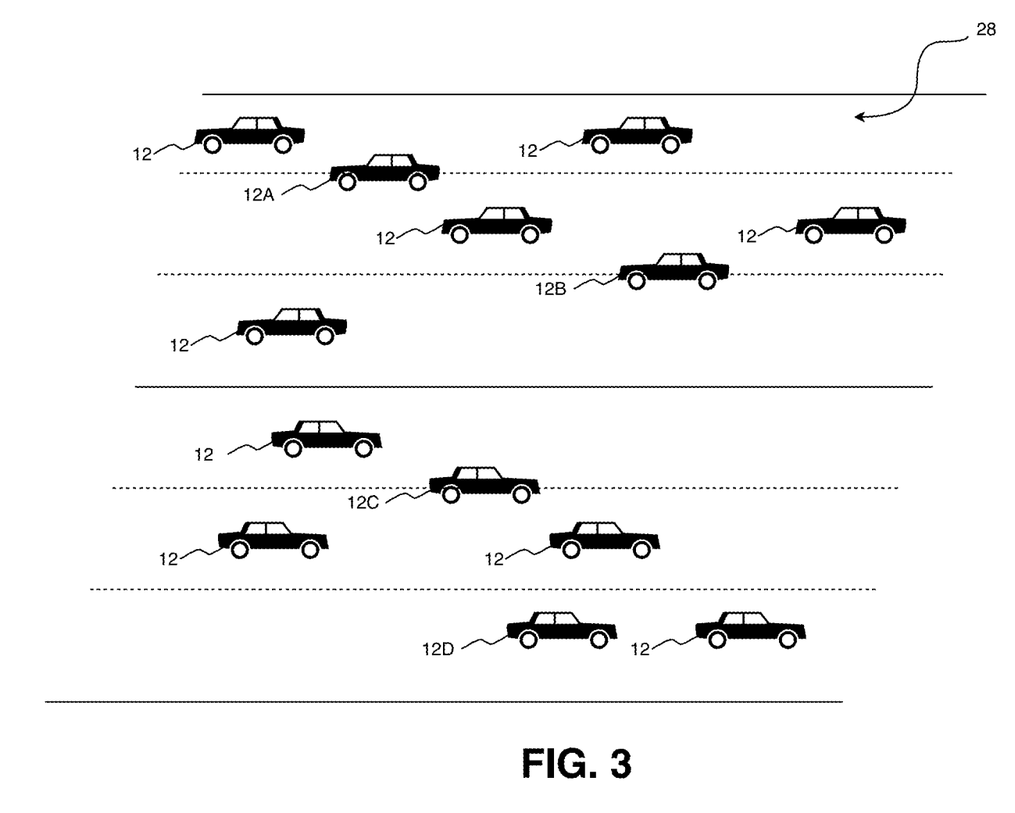
FIG. 3 illustrates a roadway system with a plurality of vehicles in accordance with the teachings of the present disclosure.

Furthermore, the route of the vehicle 12 may inhibit travel through areas associated with undesirable conditions, such as aggressive vehicle behavior and/or improper pedestrian street crossings. As an example and as shown in FIG. 2, the route may avoid intersection 27, which may be associated with substantial pedestrian traffic and/or increased instances of jaywalking caused by pedestrians 14 and/or bicyclists 16. As another example and as shown in FIG. 3, the route may avoid highway 28, which may be associated with increased instances of improper lane change operations (as indicated by vehicles 12A, 12B, 12C), improper vehicle speeds, improper following distances (as indicated by vehicle 12D), and/or other types of aggressive vehicle behavior. It should be understood that the route may inhibit travel through areas associated with other types of undesirable travel conditions and are not limited to the examples described herein.

Figure 4:
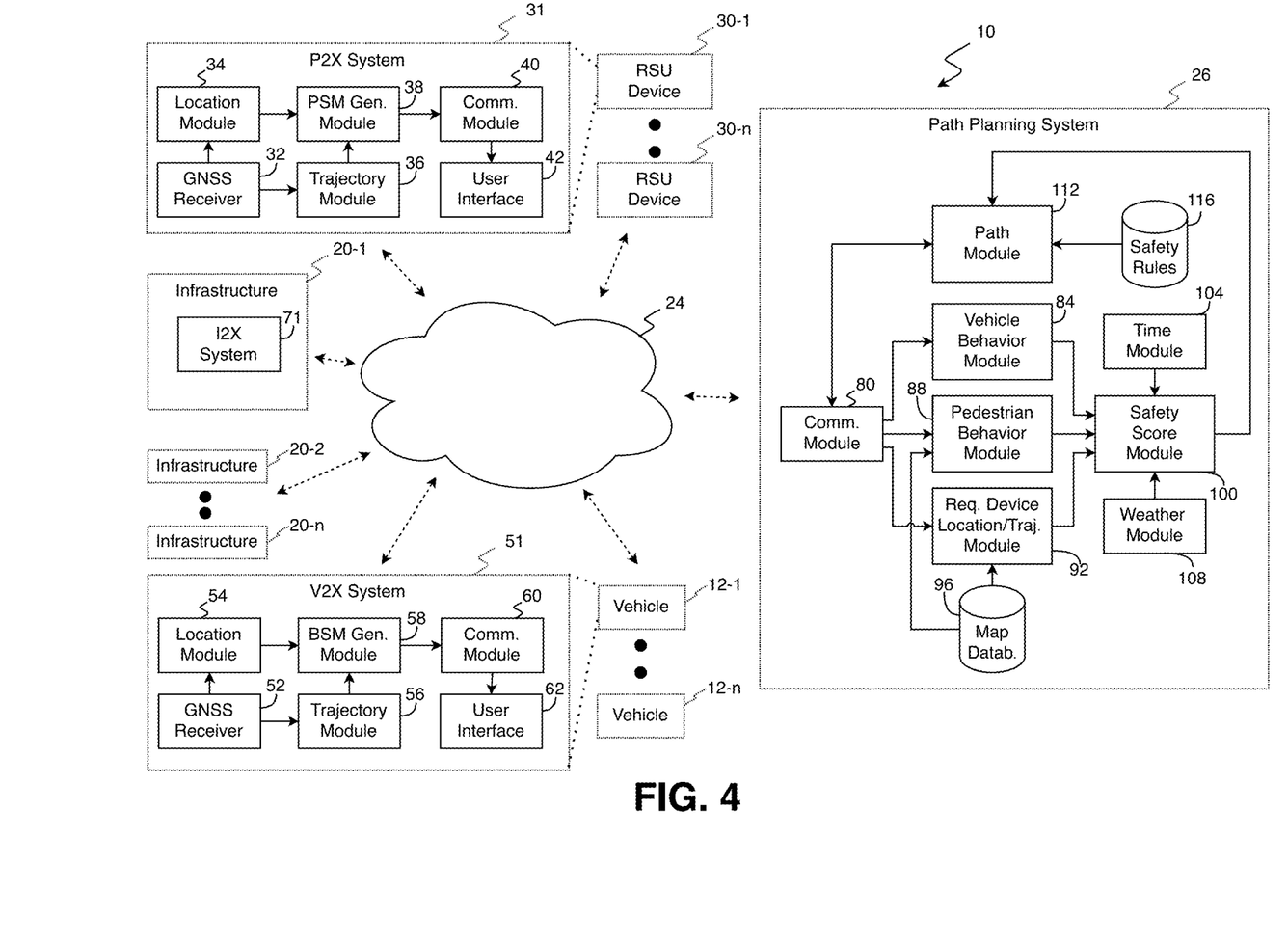
FIG. 4 is a functional block diagram of various devices and systems of a roadway system in accordance with the teachings of the present disclosure.

With reference to FIG. 4, a functional block diagram of the roadway system 10 is provided. In one form, the roadway system 10 includes vehicles 12-1, . . . , 12-n (collectively referred to herein as "vehicles 12"), infrastructure 20-1, 20-2, . . . 20-n (collectively referred to herein as "infrastructures 20"), the path planning system 26, and roadside user devices 30-1, . . . , 30-n (collectively referred to herein as "RSU devices 30"). The vehicles 12, the infrastructures 20, the RSU devices 30, and the path planning system 26 may include one or more processor circuits that execute machine-readable instructions stored in a non-transitory computer-readable medium, such as a read-only memory (ROM) circuit and/or a random-access memory (RAM) circuit for performing the functional operations described herein.

In one form, the pedestrians 14 and the bicyclists 16 are equipped with the RSU devices 30. The RSU devices 30 may be computing device that utilize a wireless communication protocol to generate a vehicle-sharing request. In one form, the RSU devices 30 may include, but are not limited to: a computer, laptop, smartphone, tablet, personal digital assistant (PDA), a wearable device, among other computing devices.

In one form, the RSU devices 30 include a P2X system 31, which as provided above, may be a DSRC system or C-P2X systems that communicates using a 75 megahertz (MHz) band around a 5.9 gigahertz (GHz) signal. It should be understood that other communication systems, center frequencies, and/or bandwidths may be implemented within the P2X system 31. In one form, the P2X system 31 includes a global navigation satellite system (GNSS) receiver 32, a location module 34, a trajectory module 36, a personal safety message (PSM) generator module 38, a communication module 40, and a user interface 42.

In one form, the GNSS receiver 32 includes various components for generating a digital GNSS signal indicative of a location of the RSU device 30, such as radio frequency (RF) filter, an RF amplifier, a local oscillator, a frequency mixer, an intermediate frequency (IF) filter, an IF amplifier, an analog-to-digital converter (ADC), among other components. The GNSS receiver 32 provides the digital GNSS signal to the location module 34 and the trajectory module 36, which determine the speed and trajectory (i.e., travel direction) of the RSU DEVICE 30-1, respectively. In one form, the location module 34 and the trajectory module 36 are implemented by a mapping software application configured to generate location and trajectory data using known location/trajectory determination techniques, such as GOOGLE® Maps, APPLE® Maps, among other mapping software applications.

In one form, the PSM generator module 38 generates a PSM based on the speed and trajectory of the RSU device 30-1. The PSM may include information regarding various dynamic characteristics of the RSU device 30-1, such as location, speed, distance, travel direction, and/or acceleration. Furthermore, the PSM may include operator characteristics associated with the RSU device 30-1, such as an age of the operator, a gender of the operator, information indicating whether the operator is using an application of the RSU device 30-1, among other operator characteristics. In one example, PSM may be configured in accordance with a standard protocol, such as Society of Automotive Engineers (SAE) J2735 or J2945/9 protocols.

In one form, the communication module 40 includes one or more transceivers, radio circuits, amplifiers, and/or modulation circuits for broadcasting the PSM to other devices of the roadway system 10 and receiving basic safety messages (BSMs) from other devices in the roadway system 10.

In one form, the user interface 42 includes a graphical user interface display and/or an audio system to provide visual and/or audio outputs based on received BSMs and/or receive requesting parameter inputs from the pedestrian 14/bicyclist 16, such as a desired location (e.g., a destination) and/or a desired trajectory, as described below in further detail. As an example, the user interface 42 may include a touchscreen device to receive inputs corresponding to the requesting parameters. As another example, the user interface 42 includes an augmented reality (AR) device configured to receive inputs corresponding to the requesting parameters using an AR overlay operation. As an additional example, the user interface 42 may include microphones, speakers, and/or natural language user interface systems for receiving voice queries corresponding to the requesting parameters. Along with generating outputs based on the BSMs, the user interface 42 may be communicably coupled to other modules within the RSU device 30-1.

It should be understood that one or more modules of P2X system 31 can be realized as standards components of the RSU device 30 and thus, the P2X system 31 within the RSU device 30 is not required to have separate dedicated modules. For example, the P2X system 31 can employ a GNSS receiver, communication module, and user interface of the RSU device to carry out the operations described above with the respective module.

In one form, the vehicles 12 are equipped with a V2X system 51 that includes a GNSS receiver 52, a location module 54, a trajectory module 56, a BSM generator module 58, a communication module 60, and a user interface 62. The GNSS receiver 52, the location module 54, the trajectory module 56, and the user interface 62 are similar to the GNSS receiver 32, the location module 34, the trajectory module 36, and the user interface 42.

In one form, the BSM generator module 58 is configured to generate BSMs that include the current vehicle position (e.g., latitude, longitude, elevation, among others), speed, heading, brake status, turn signal status, energy information indicative of an electrical charge and/or fuel level of the vehicle 12-1, and/or other vehicle information. In one example, the BSM may be configured in accordance with a standard protocol, such as Society of Automotive Engineers SAE J2735 and are used or transmitted in accordance with SAE J2945/1 or SAE J3161/1.

In one form, the communication module 60 includes one or more transceivers, radio circuits, amplifiers, and/or modulation circuits for broadcasting the BSMs to other devices of the roadway system 10 and receiving PSMs and BSMs from other devices in the roadway system 10. As an example, the vehicle 12-1 may use BSMs and PSMs received via the communication module 60 to perform various path/trajectory planning routines and/or the like. Along with exchanging data with external devices, the communication module 60 may also be communicably coupled to a vehicle communication network (not shown), such as a controller area network (CAN), a local interconnect network (LIN), and/or a clock extension peripheral interface (CXPI) bus.

In one form, the infrastructures 20 each include a I2X system 71 configured to transmit and receive BSMs and PSMs. The I2X system 71 is similar to the P2X system 31 and V2X system 51, but in this form, the I2X system 71 may be a proxy V2X/P2X system that includes one or more sensing devices (e.g., a sonar system, a radar system, and/or other suitable object detection devices) for detecting nearby objects (e.g., vehicles 12, pedestrians 14, and bicyclists 16) and one or more modules for generating BSMs and PSMs based on the detected objects. As such, the proxy V2X system may generate BSMs for vehicles 12 that are not equipped with the V2X system 51 and PSMs for pedestrians 14 and bicyclists 16 that are not equipped with the P2X system 31. Example proxy V2X systems are described in U.S. Pat. No. 9,460,625 titled "PROXY DSRC BASIC SAFETY MESSAGE FOR UNEQUPPED VEHICLES," which is commonly owned and the disclosure of which is incorporated by reference. While not shown, it should be understood that the buildings 22 may be equipped with a proxy V2X system similar to the I2X system 71 in some forms.

In one form, the path planning system 26 includes a communication module 80, a vehicle behavior module 84, a pedestrian behavior module 88, a requesting device location-trajectory (RDLT) module 92, a map database 96, a safety score module 100, a time module 104, a weather module 108, a path module 112, and a safety rules database 116. It should be understood that the modules and the databases (e.g., a repository, a cache, and/or the like) of the path planning system 26 may be positioned at the same location or distributed at different locations (e.g., at one or more edge computing devices) and communicably coupled accordingly. In one form, the modules of the path planning system 26 are communicably coupled using a wired and/or wireless communication protocol (e.g., a Bluetooth®-type protocol, a cellular protocol, a Wi-Fi-type protocol, a near-field communication (NFC) protocol, an ultra-wideband (UWB) protocol, among others).

In one form, the communication module 80 includes one or more transceivers, radio circuits, amplifiers, and/or modulation circuits for receiving BSMs and PSMs broadcasted by the P2X systems 31, the V2X systems 51, and the I2X systems 71 and broadcasting a route determined by the path module 112 to a requesting device (e.g., at least one of the RSU devices 30 and the vehicles 12).

The vehicle behavior module 84 is configured to determine behavior information associated with the vehicles 12. In one form, the vehicle behavior information is indicative of a speed, an aggressiveness, and/or a trajectory of the vehicles 12. The vehicle behavior module 84 is configured to obtain the speed, trajectory, the location data of the vehicles, the heading, the turn signal status, and energy information from the BSMs broadcasted by the vehicles 12 and/or infrastructures 20 and performs an unsupervised machine learning routine, such as a clustering routine, to determine the aggressiveness of the vehicles 12.

As an example, the vehicle behavior module 84 may perform the clustering routine to determine whether the data of the BSM is associated with various types of behaviors associated with aggressive operation, such as sudden braking, sudden accelerations, sudden turns, sudden lane changes, excessive vehicle speeds, among other vehicle behavior types. Specifically, for each vehicle 12, the vehicle behavior module 84 may assign each of the behavior types an aggressiveness score (weighted or unweighted), and a sum of the scores may be indicative of the aggressiveness of the respective vehicle 12. Furthermore, the vehicle behavior module 84 may perform a statistical analysis of the aggressiveness scores (e.g., a mean, median, and/or other suitable arithmetic representation of the aggressiveness scores) to determine an aggregate aggressiveness score for a given location of the roadway system 10.

The pedestrian behavior module 88 is configured to determine behavior information associated with the pedestrians 14 and the bicyclists 16 (collectively referred to hereinafter as "pedestrian behavior information"). In one form, the pedestrian behavior information is indicative of dynamic characteristics of the RSU devices 30 (e.g., a location, trajectory, and/or speed of the RSU devices 30). The pedestrian behavior module 88 obtains the dynamic characteristics, the operational characteristics, and roadway data from the map database 96 and performs an unsupervised machine learning routine, such as a clustering routine, to predict a likelihood that the pedestrians 14 and/or the bicyclists 16 will perform an improper street crossing in a given area of the roadway system 10.

As an example, the pedestrian behavior module 88 obtains the location, trajectory, and speed of the RSU devices 30 as indicated by the PSMs broadcasted by the RSU devices 30 and/or the infrastructures 20 and predicts a route of each pedestrian 14 and/or bicyclist 16. Furthermore, the pedestrian behavior module 88 may obtain various operational characteristics of the pedestrians 14 and/or bicyclists 16, such as an age, gender, and application usage of the corresponding RSU devices 30. Additionally, the pedestrian behavior module 88 obtains roadway data from that map database 96 including, but not limited to, roadway widths, the presence of designated crosswalks, among other relevant roadway data. Accordingly, the pedestrian behavior module 88 may perform the clustering routine to determine the likelihood that the pedestrians 14 and/or the bicyclists 16 will perform an improper street crossing in a given area of the roadway system 10 based on the predicted route, the operational characteristics, and the roadway data.

While the above examples describe using clustering techniques, it should be understood that the vehicle behavior module 84 and/or the pedestrian behavior module 88 may perform other types of machine learning and/or deep learning routines to determine the vehicle behavior information and pedestrian behavior information, respectively. For example, the vehicle behavior module 84 and/or the pedestrian behavior module 88 may be a deep convolutional neural network configured to perform Bayesian inference statistical routines to determine the vehicle behavior information and pedestrian behavior information, respectively.

In one form, the RDLT module 92 is configured to receive and identify the requesting parameters input by the operator of the requesting device (i.e., one of the vehicles 12 and/or the RSU devices 30), such as a desired location (e.g., a destination) and/or a desired trajectory. In one form, the RDLT module is configured to identify a plurality of travel routes overlayed a map from the map database 96 for the requesting device using known route planning routines and provide the identified travel routes to the safety score module 100.

In one form, the safety score module 100 is configured to generate safety scores for each of the identified travel routes based on the vehicle behavior information, the pedestrian behavior information, historical time information provided by the time module 104, and/or historical weather information provided by the weather module 108. In one form, the safety scores correspond to an increased likelihood of an improper roadway crossing and/or aggressive vehicle behavior along the identified travel routes. In one form, the safety score module 100 generates a safety score for various sections of the roadways associated with the identified travel routes. In some forms, the safety score is a probability value. It should be understood that that the safety score may be any numerical representation of the likelihood of an improper roadway crossing and/or aggressive vehicle behavior, such as a numerical range (e.g., 0.1-10, where a 0.1 indicates a high likelihood of an improper roadway crossing and/or aggressive vehicle behavior, and a 10 indicates a low likelihood of an improper roadway crossing and/or aggressive vehicle behavior).

In one form, the historical time information indicates a likelihood of an improper roadway crossing and/or aggressive vehicle behavior that is determined based on previously detected improper roadway crossings and/or aggressive vehicle behaviors at a given time. The given time may correspond to a nominal time values, a continuous time value, and/or a qualitative time value. As used herein, "nominal time value" refers to a discrete time (e.g., 8:30 PM, 9:15 AM, among others). As used herein, "continuous time value" refers to a period of time between two nominal time values (e.g., the time between 8:30-9:30 PM). As used herein, "qualitative time value" refers to a nonnumerical description of a time period (e.g., morning, afternoon, evening, day of the week, rush-hour period, holidays, sporting events, concerts among others).

In one form, the weather information can be used to indicate a likelihood of an improper roadway crossing and/or aggressive vehicle behavior that is determined based on previously detected weather conditions. As an example, precipitation may decrease the likelihood of an improper roadway crossing and/or aggressive vehicle behavior.

As an example, the safety score module 100 performs a deep neural network learning routine that aggregates the individual probabilities of an improper roadway crossing and/or aggressive vehicle behavior determined by the pedestrian behavior information, historical time information, and historical weather information (weighted or unweighted) to determine the safety score of the roadway or a given section thereof.

In one form, the path module 112 is configured to determine a route of the requesting device based on the safety scores of the identified travel routes, traffic signal state information, and/or energy information of the requesting device. In one form, the path module 112 determines the route based on a comparison of the safety scores of the identified travel routes to a threshold score. In some forms, the threshold score is a predefined value, a dynamic value, or an arithmetic representation (e.g., a mean, median, etc.) of at least a set of the safety scores. As an example, the path module 112 selects the route that includes a safety score for each roadway or section thereof that is greater than a threshold score.

In some forms, if two or more travel routes include a safety score for each roadway or section thereof that is greater than the threshold score, the path module 112 may select the route from among the travel routes based on rules provided by the safety rules database 116. As an example, the rules may include selecting a route from among multiple potential route that is associated with: a shortest travel distance (as indicated by the requesting parameters); a shortest travel time (as indicated by the requesting parameters and/or traffic signal state information from the BSMs broadcasted by the infrastructures 20); a lowest energy consumption (as indicated by the BSMs broadcasted by the vehicle 12, as the requesting device); and/or a highest safety score.

Figure 5:
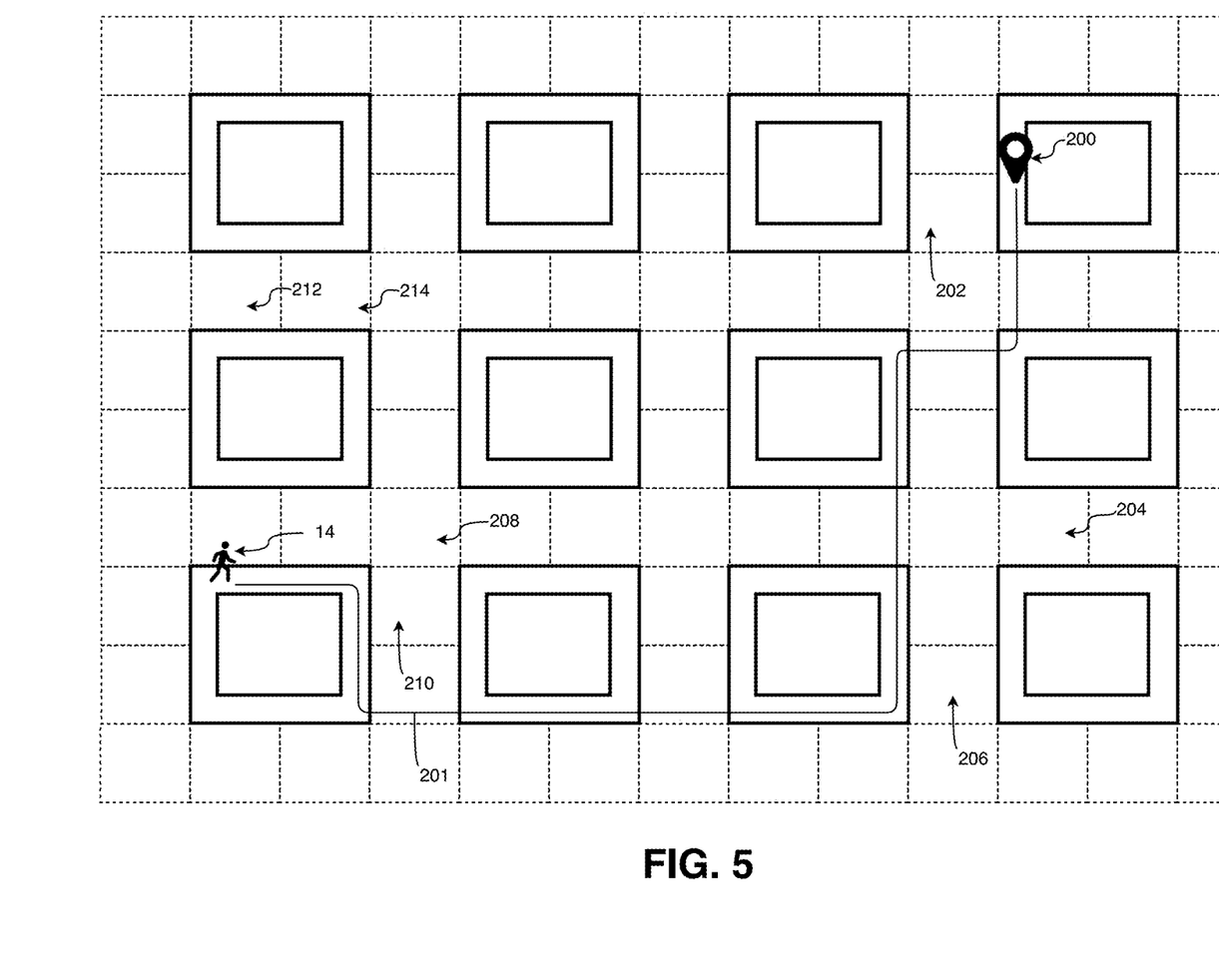
FIG. 5 illustrates a route provided to an operator of a RSU in accordance with the teachings of the present disclosure.
Figure 6:
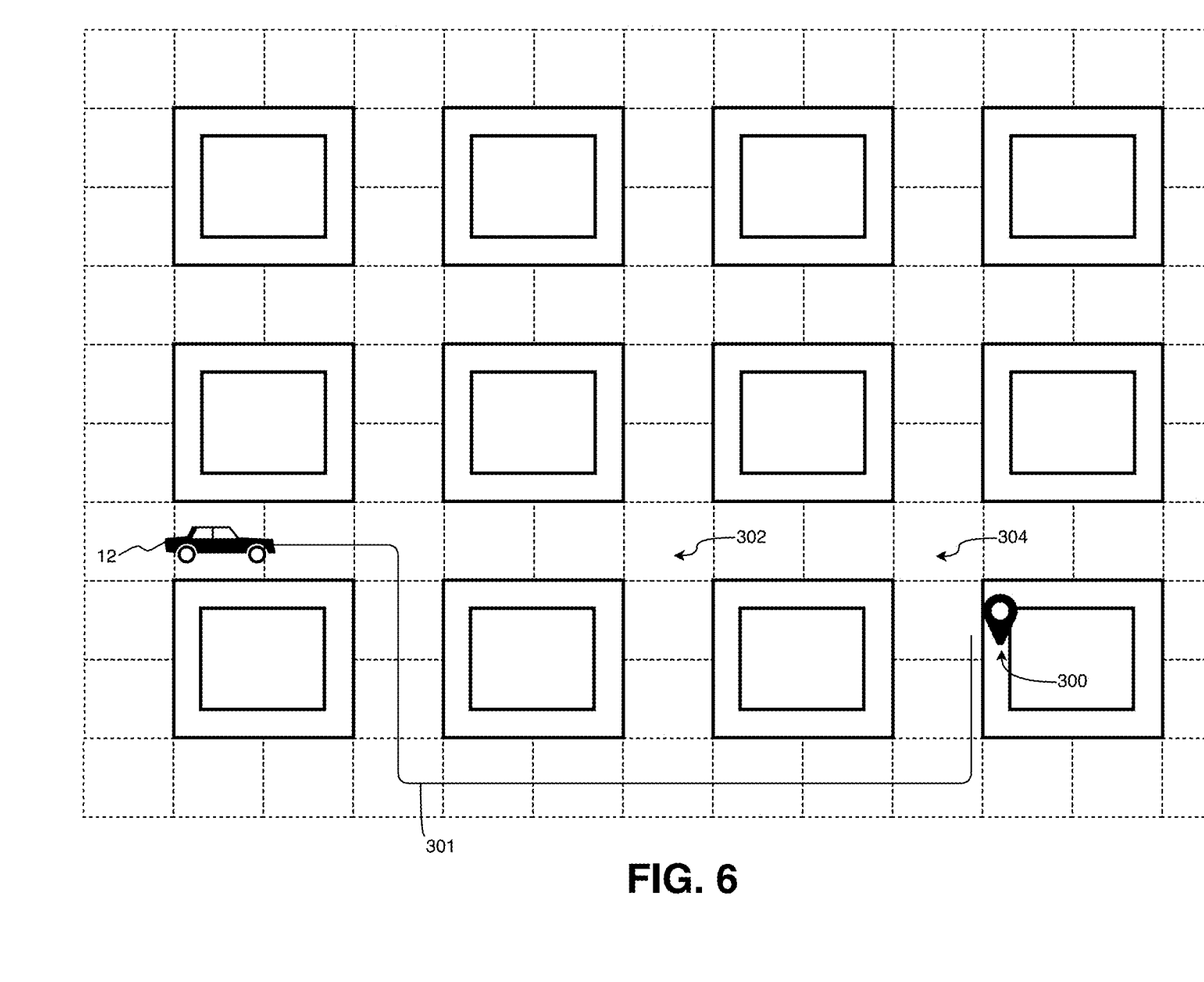
FIG. 6 illustrates a route provided to an operator of a vehicle in accordance with the teachings of the present disclosure.

As an example and as shown in FIG. 5, when the requesting device is a RSU device 30 (not shown in FIG. 5) provided with the pedestrian 14, and the requesting parameters include a request for traveling to destination 200, the path module 112 identifies route 201 as the identified travel route. More specifically, the route 201 avoids crosswalks located at sections 202, 204, 206, 208, 210, 212, 214 of the roadway system as a result of the corresponding sections 202, 204, 206, 208, 210, 212, 214 having a safety score that is below the threshold value. As another example and as shown in FIG. 6, when the requesting device is a vehicle 12, and the requesting parameters include a request for traveling to destination 300, the path module 112 identifies route 301 as the identified travel route. More specifically, the route 301 avoids crosswalks located at sections 302, 304 of the roadway system as a result of the corresponding sections 302, 304 having a safety score that is below the threshold value.

Figure 7:
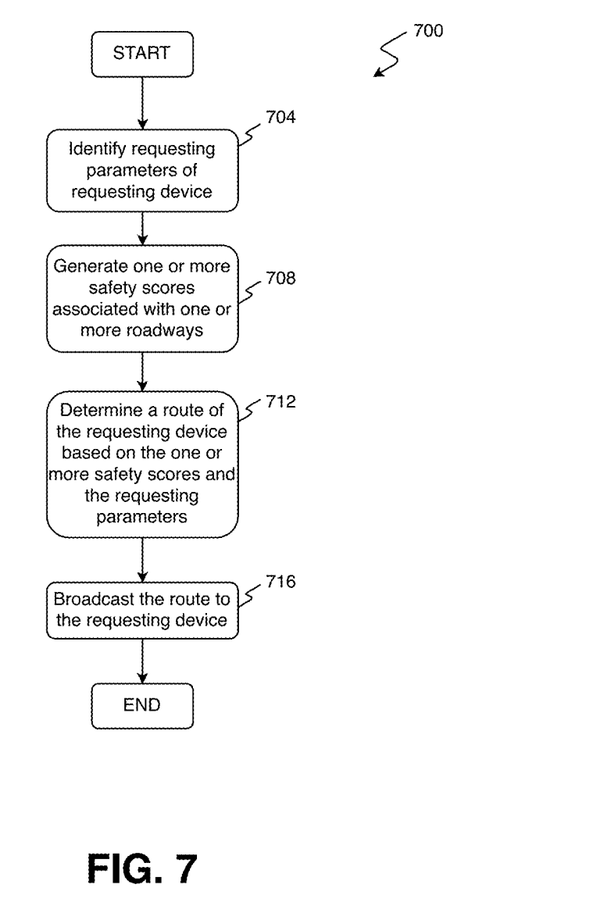
FIG. 7 illustrates an example control routine performed by a roadway system in accordance with the teachings of the present disclosure.

With reference to FIG. 7, an example routine 700 performed by the path planning system 26 is shown. At 704, the path planning system 26 identifies requesting parameters broadcasted by the requesting device. At 708, the path planning system 26 generates one or more safety scores associated with one or more roadways based on vehicle behavior information associated with vehicles 12, pedestrian behavior information associated with the RSU devices 30, or a combination thereof. At 712, the path planning system 26 determines a route of the requesting device based on the one or more safety scores and the requesting parameters. At 716, the path planning system 26 broadcasts the determined route to the requesting device.

Figure 8:
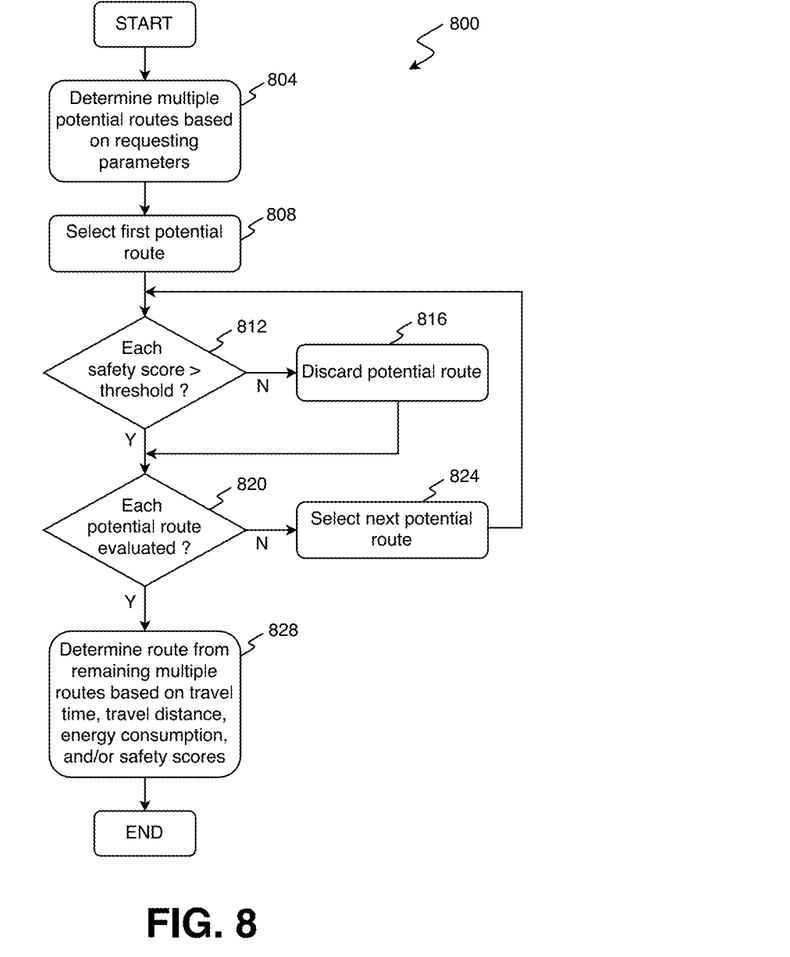
FIG. 8 illustrates an example control routine performed by a roadway system in accordance with the teachings of the present disclosure.

With reference to FIG. 8, an example routine 800 performed by the path planning system 26 is shown. At 804, the path planning system 26 identifies multiple potential travel routes based the requesting parameters. At 808, the path planning system 26 selects a first potential travel route. At 812, the path planning system 26 determines whether each determined safety score of the potential travel route is greater than the threshold safety score. If each determined safety score of the potential travel route is greater than the threshold safety score, the routine 800 proceeds to 820. Otherwise, the routine 800 proceeds to 816, where the path planning system 26 discards the potential route and then proceeds to 820.

At 820, the path planning system 26 determines whether each potential route has been evaluated. If so, the routine 800 proceeds to 828. Otherwise, if each potential route has not been evaluated, the routine 800 proceeds to 824, where the path planning system 26 selects the next potential route, and the routine 800 proceeds to 812. At 828, the path planning system 26 determines the route from among the remaining routes based on the travel time, travel distance, energy consumption, and/or safety scores. As an example, the path planning system 26 may select the route having the highest safety score from among the remaining routes, the shortest travel time, the shortest travel distance, or the lowest energy consumption.

It should be readily understood that routines 700, 800 are example control routines and other control routines may be implemented.

The path planning system 26 described herein is configured to identify requesting parameters provided by the operator of the requesting device (e.g., an operator of a vehicle 12, a pedestrian 14 or bicyclist 16 operating a RSU device 30), which include a location of a requesting device and/or a trajectory of a requesting device. The path planning system 26 generates safety scores for various potential routes based on vehicle behavior information and/or pedestrian behavior information and determines a route of the requesting device based on the safety scores and the requesting parameters. As such, the path planning system 26 is configured to provide a route to the requesting device that inhibits travel through areas associated with undesirable conditions, such as aggressive vehicle behavior and/or improper pedestrian street crossings.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A processor-implemented method for guiding a user operating a requesting device, the method comprising:
   receiving, by the processor, requesting parameters input by the user of the requesting device;
   identifying, by the processor, the requesting parameters of the requesting device, wherein the requesting parameters include a location of the requesting device, a trajectory of the requesting device, or a combination thereof;
   generating, by the processor, one or more safety scores associated with one or more roadways based on vehicle behavior information associated with one or more vehicles, pedestrian behavior information associated with one or more roadside unit devices, or a combination thereof, wherein the vehicle behavior information and the pedestrian behavior information include both present and historical information;

determining, by the processor, a route of the requesting device based on the one or more safety scores and the requesting parameters; and broadcasting, by the processor, the route to the requesting device.

2. The method of claim 1, wherein the route is determined based on a comparison of the one or more safety scores to a threshold score.

3. The method of claim 2, wherein the route is associated with a set of roadways from among the one or more roadways, and wherein each roadway from the set of roadways has a respective safety score that is greater than the threshold score.

4. The method of claim 1, wherein the route is determined based on traffic signal state information associated with the one or more roadways.

5. The method of claim 1, wherein the requesting device is one of a subject vehicle from among the one or more vehicles and a subject roadside unit device from among the one or more roadside unit devices.

6. The method of claim 5, wherein:
the requesting device is the subject vehicle;
the route is determined based on energy information associated the subject vehicle; and
the energy information is indicative of an electrical charge of the subject vehicle, a fuel level of the subject vehicle, or a combination thereof.

7. The method of claim 1 wherein the vehicle behavior information is indicative of a speed of the one or more vehicles, an aggressiveness of the one or more vehicles, a trajectory of the one or more vehicles, or a combination thereof.

8. The method of claim 1 further comprising determining the vehicle behavior information based on one or more basic safety messages broadcasted by a vehicle communication system.

9. The method of claim 1 wherein the pedestrian behavior information is indicative of a location of the one or more roadside unit devices, a trajectory of the one or more roadside unit devices, a speed of the one or more roadside unit devices, or a combination thereof.

10. The method of claim 1 further comprising determining the pedestrian behavior information based on one or more personal safety messages broadcasted by a pedestrian-to-infrastructure communication system.

11. The method of claim 1, wherein the one or more safety scores are generated to include a safety score corresponding to a likelihood of at least one of an improper roadway crossing or aggressive vehicle behavior at a given time based on historical information.

12. The method of claim 1, wherein the roadway is that part of a traffic way designed, improved, and used for motor vehicle travel.

13. A processor-implemented method for guiding a user operating a requesting device, the method comprising:
receiving, by the processor, requesting parameters input by the user of the requesting device;
identifying, by the processor, the requesting parameters of the requesting device, wherein the requesting parameters include a location of the requesting device, a trajectory of the requesting device, or a combination thereof;
generating, by the processor, one or more safety scores associated with one or more roadways based on vehicle behavior information associated with one or more vehicles, pedestrian behavior information associated with one or more roadside unit devices, or a combination thereof, wherein:
the vehicle behavior information is indicative of a speed of the one or more vehicles, an aggressiveness of the one or more vehicles, a trajectory of the one or more vehicles, or a combination thereof;
the pedestrian behavior information is indicative of a location of the one or more roadside unit devices, a trajectory of the one or more roadside unit devices, a speed of the one or more roadside unit devices, or a combination thereof; and
the vehicle behavior information and the pedestrian behavior information include both present and historical information;
determining, by the processor, a route of the requesting device based on the one or more safety scores and the requesting parameters; and
broadcasting, by the processor, the route to the requesting device.

14. The method of claim 13, wherein the route is determined based on a comparison of the one or more safety scores to a threshold score.

15. The method of claim 14, wherein the route is associated with a set of roadways from among the one or more roadways, and wherein each roadway from the set of roadways has a respective safety score that is greater than the threshold score.

16. The method of claim 13, wherein the route is determined based on traffic signal state information associated with the one or more roadways.

17. The method of claim 13, wherein the requesting device is one of a subject vehicle from among the one or more vehicles and a subject roadside unit device from among the one or more roadside unit devices.

18. The method of claim 17, wherein:
the requesting device is the subject vehicle;
the route is determined based on energy information associated the subject vehicle; and
the energy information is indicative of an electrical charge of the subject vehicle, a fuel level of the subject vehicle, or a combination thereof.

19. The method of claim 13 further comprising:
determining the vehicle behavior information based on one or more basic safety messages broadcasted by a vehicle communication system; and
determining the pedestrian behavior information based on one or more personal safety messages broadcasted by a pedestrian-to-infrastructure communication system.

20. The method of claim 13, wherein the one or more safety scores are generated to include a safety score corresponding to a likelihood of at least one of an improper roadway crossing or aggressive vehicle behavior at a given time based on historical information.

21. The method of claim 13, wherein the roadway is that part of a traffic way designed, improved, and used for motor vehicle travel.

22. A system comprising:
a processor; and
a nontransitory computer-readable medium including instructions that are executable by the processor, wherein the instructions include:
receiving requesting parameters input by the user of the requesting device;
identifying requesting parameters of the requesting device, wherein the requesting parameters include a location of the requesting device, a trajectory of the requesting device, or a combination thereof;

generating one or more safety scores associated with one or more roadways based on vehicle behavior information associated with one or more vehicles, pedestrian behavior information associated with one or more roadside unit devices, or a combination thereof, wherein:

the vehicle behavior information is indicative of a speed of the one or more vehicles, an aggressiveness of the one or more vehicles, a trajectory of the one or more vehicles, or a combination thereof;

the pedestrian behavior information is indicative of a location of the one or more roadside unit devices, a trajectory of the one or more roadside unit devices, a speed of the one or more roadside unit devices, or a combination thereof; and wherein the vehicle behavior information and the pedestrian behavior information include both present and historical information;

determining a route of the requesting device based on the one or more safety scores and the requesting parameters; and broadcasting the route to the requesting device.

23. The system of claim 22, wherein the route is determined based on a comparison of the one or more safety scores to a threshold score.

24. The system of claim 23, wherein the route is associated with a set of roadways from among the one or more roadways, and wherein each roadway from the set of roadways has a respective safety score that is greater than the threshold score.

* * * * *

UNITED STATES PATENT AND TRADEMARK OFFICE
CERTIFICATE OF CORRECTION

PATENT NO. : 11,961,394 B2
APPLICATION NO. : 17/216248
DATED : April 16, 2024
INVENTOR(S) : Joseph Lull et al.

Page 1 of 1

It is certified that error appears in the above-identified patent and that said Letters Patent is hereby corrected as shown below:

In the Claims

Column 13, Line 54: In Claim 12, delete "traffic way" and insert --trafficway--

Column 14, Line 57: In Claim 21, delete "traffic way" and insert --trafficway--

Signed and Sealed this
Fifteenth Day of April, 2025

Coke Morgan Stewart
*Acting Director of the United States Patent and Trademark Office*